W. V. SEIFERT.
WELL DIGGER.
APPLICATION FILED JULY 20, 1920.
1,388,314.
Patented Aug. 23, 1921.
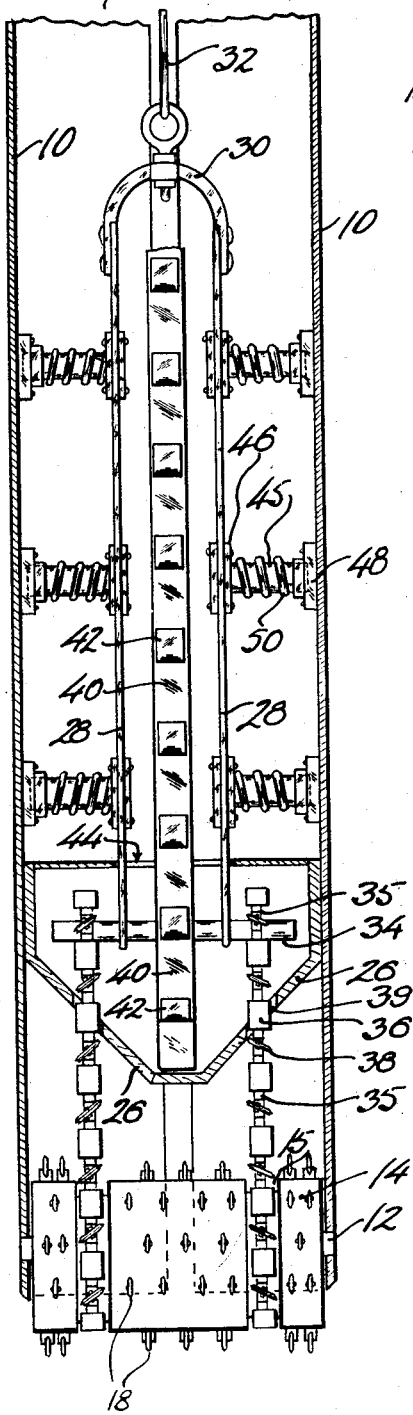
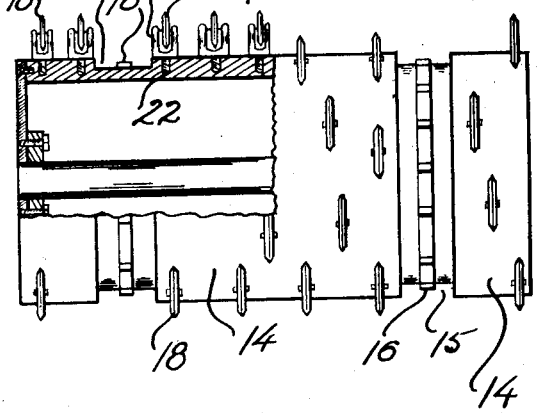
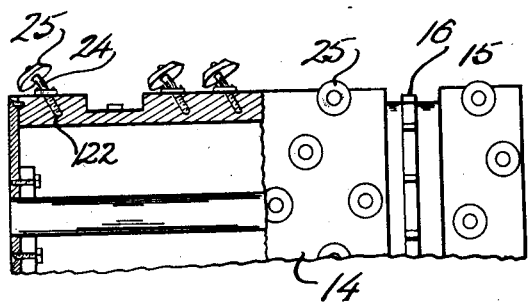
William V. Seifert
Inventor
Attorney

UNITED STATES PATENT OFFICE.

WILLIAM V. SEIFERT, OF DENVER, COLORADO.

WELL-DIGGER.

1,388,314. Specification of Letters Patent. Patented Aug. 23, 1921.

Application filed July 20, 1920. Serial No. 397,588.

*To all whom it may concern:*

Be it known that I, WILLIAM V. SEIFERT, a citizen of the United States, residing at the city and county of Denver and State of Colorado, have invented certain new and useful Improvements in Well-Diggers; and I do declare the following to be a full, clear, and exact description of the invention, such as will enable others skilled in the art to which it appertains to make and use the same, reference being had to the accompanying drawings, and to the characters of reference marked thereon, which form a part of this specification.

The object of this invention is to provide a digging or cutting device to be carried on the lower end of the cable which may be lowered into a hole.

Briefly the invention comprises a split cylindrical member supported on a cable and carrying at its lower end a cylinder having a horizontal axis, the face of the cylinder being provided with a plurality of cutting disks. Conveying means extend downwardly into the split cylinder and pass around the digging cylinder for the purpose of rotating the same to cause it to cut out the earth or rock as the device descends, the excavated material being removed by the conveyer.

In the drawings:

Figure 1 is a vertical section through the device.

Fig. 2 is a view partially in section and partially in elevation, showing one arrangement of disks on the horizontal digging cylinder; and Fig. 3 is a similar view showing another arrangement of disks.

The parts of a split cylinder 10 have journaled between them at 12 a horizontally disposed digging cylinder 14, provided with annular grooves 15 in which are mounted sprocket teeth 16.

In Fig. 2 cutting disks 18 are shown mounted on brackets 20 by means of pivots whose axes are parallel with the axis of the digging cylinder. The lower ends of the brackets are preferably threaded into the cylinder wall as shown at 22.

In Fig. 3 mountings 24, somewhat after the fashion of bolts, are threaded at an angle into the wall of the cylinder 14, as indicated at 122, and cutting disks 25 are mounted on the outer ends thereof at an angle as shown. The particular style of disk will be varied according to the material which is encountered.

Positioned above its transverse cylinder 14 is a hopper 26, supported in the split cylinder by means of depending arms 28, carried by a yoke 30, to which the supporting cable 32 is attached. The lower ends of the arms 28 carry a shaft 34, provided with sprockets over which there passes a pair of conveyers 35 provided with elevating pockets 36 and cutting disks 38. Said conveyers 35 pass upwardly into the hopper through openings 39 in the lower sloping walls thereof, the material being discharged into said hopper. A main conveyer 40 which extends to the surface and is provided with elevating pockets 42, also passes about the shaft 34, driving the conveyers 35 which in turn drive the digging cylinder 14. The top of the hopper 26 is provided with an opening 44 for the passage of said conveyer 40. Secured to the arms 28 is a plurality of piston-like members 45, carried on mountings 46, which project into passages in guides 48, secured to the side walls of the split cylinder 10, a spring 50 being disposed about each piston 45 and engaging the mountings 46 and 48. In this manner the springs 50 tend to urge the cylinder members 10 outwardly against the sides of the hole which has been dug.

I claim:

1. In a well digger, a member adapted to be lowered into a hole, a rotary member at the lower end of said member, cutting disks on said rotary member, and a conveyer passing over said rotary member and adapted to elevate material loosened by said disks.

2. In a well digger, a member adapted to be lowered into a hole, a rotary member at the lower end of said member, cutting disks on said rotary member, and a conveyer passing over said rotary member and adapted to elevate material loosened by said disks, said conveyer also carrying cutting elements.

3. In a well digger, a member adapted to be lowered into a hole, a rotary member at the lower end of said member, cutting disks on said rotary member, and a conveyer passing over said rotary member and adapted to elevate material loosened by said disks, said conveyer also carrying cutting elements, said conveyer serving as means for rotating said rotary member.

4. In a well digger, a member adapted to be lowered into a hole, a rotary member at the lower end of said member, cutting disks on said rotary member, a conveyer passing over said rotary member and adapted to elevate material loosened by said disks, a hopper also carried by said member and having openings in the lower wall thereof through which said conveyer passes for discharge of material into the hopper, and a second conveyer to convey material from said hopper.

5. In a well digger, a member adapted to be lowered into a hole, a rotary cylinder at the lower end of the member, a pair of conveyers passing over the cylinder and having driving engagement therewith for the purpose of rotating the same, cutting elements on the cylinder, a hopper mounted in said member above the cylinder having openings in the bottom thereof, for the passage of said conveyers for the discharge of material into said hopper, and another conveyer extending downward into the hopper for the purpose of elevating material therefrom.

In testimony whereof I affix my signature.

WILLIAM V. SEIFERT.